March 13, 1951     L. A. COLE     2,545,260
APPARATUS FOR REGULATING POWER
USED BY PULP GRINDERS Filed June 3, 1948                           8 Sheets-Sheet 1

INVENTOR
L. A. COLE
BY: Fetherstonhaugh & Co.
ATT'YS

INVENTOR
L. A. COLE

March 13, 1951

L. A. COLE 2,545,260

APPARATUS FOR REGULATING POWER
USED BY PULP GRINDERS

Filed June 3, 1948

INVENTOR
L. A. COLE
By: Fetherstonhaugh & Co.
ATT'YS

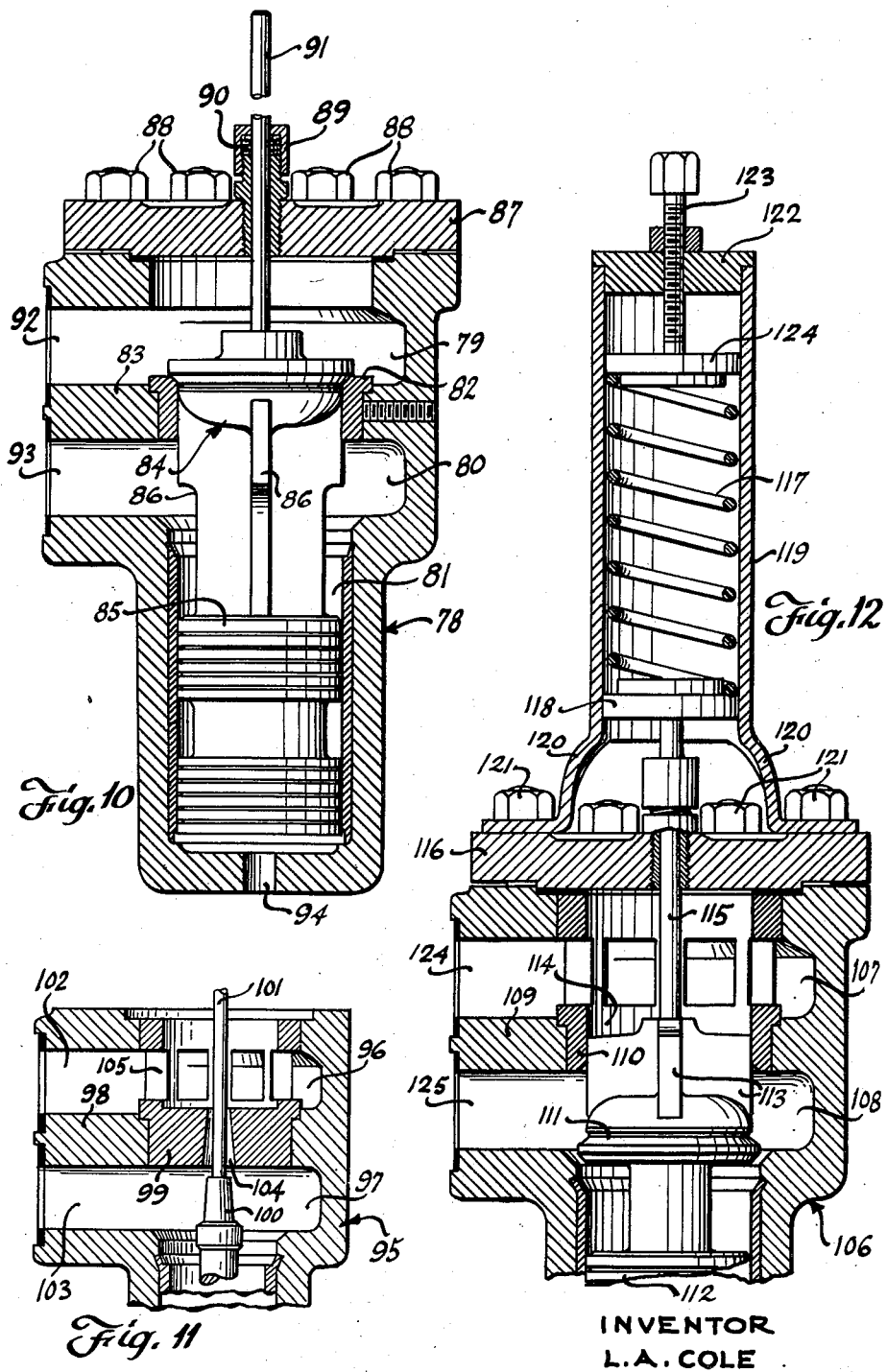

March 13, 1951 — L. A. COLE — 2,545,260
APPARATUS FOR REGULATING POWER USED BY PULP GRINDERS
Filed June 3, 1948 — 8 Sheets-Sheet 8
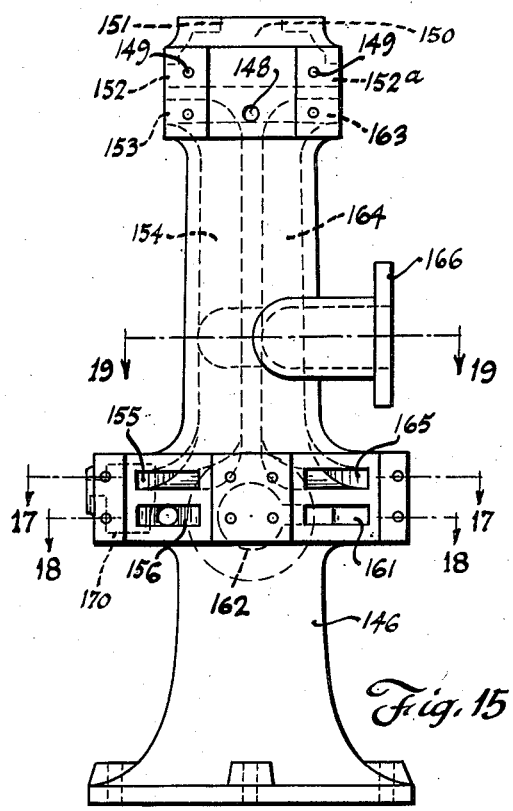
Fig. 15
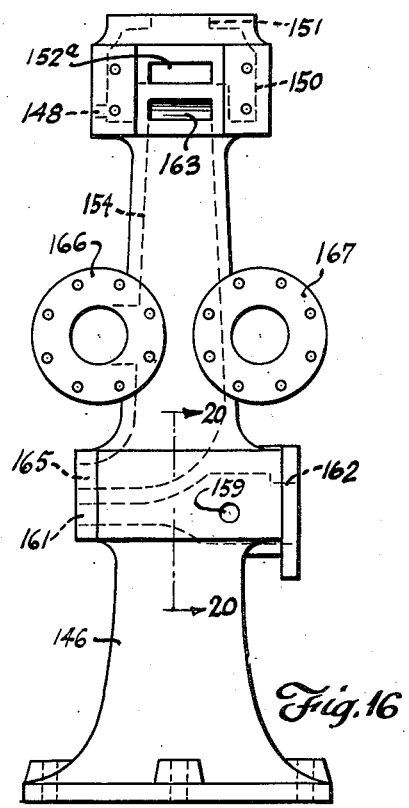
Fig. 16
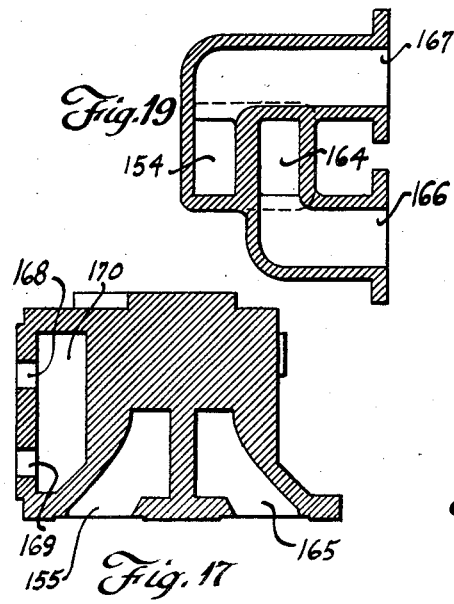
Fig. 19
Fig. 17
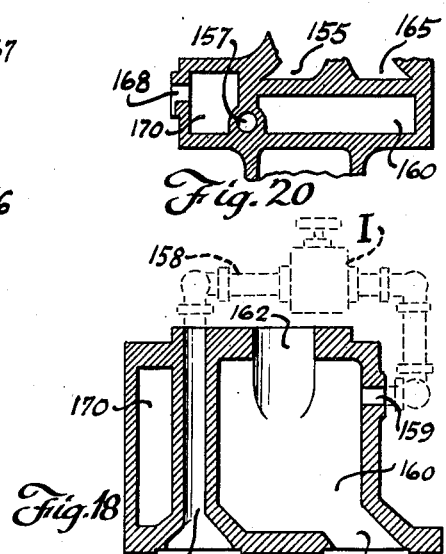
Fig. 20
Fig. 18
INVENTOR
L. A. COLE
By Fetherstonhaugh & Co.
ATT'YS Patented Mar. 13, 1951

2,545,260

UNITED STATES PATENT OFFICE 2,545,260

APPARATUS FOR REGULATING POWER USED BY PULP GRINDERS

Lorne A. Cole, Brantford, Ontario, Canada

Application June 3, 1948, Serial No. 30,943

12 Claims. (Cl. 60—97)

This invention relates to method and apparatus for regulating the power used by pulp grinders employed by the pump and paper industry for grinding logs against motor driven grindstones.

The usual arrangement of pulp grinding devices involves a synchronous grinding motor carrying a pair of grinding wheels at either end, and mounted in pockets, each grinding wheel or stone having a magazine on either side adapted to receive logs. A pressure cylinder is mounted in conjunction with each magazine having a grinder or pressure foot which is actuated thereby and forces the logs against the grinding wheel. The system employed for actuating the hydraulic pressure cylinders in the conventional arrangement includes a reservoir of water and a pump which provides high-pressure water from the reservoir, which passes through a governor such as that disclosed in my former Patent 387,960 in Canada. Thus, all hydraulic pressure cylinders are operated from one high-pressure line controlled from such a governor in prior arrangements.

The governor disclosed in Canadian Patent 387,960 was particularly designed to smooth out power or load peaks which occurred when certain conditions arose due to changing load between the various grinder feet of say, a four-cylinder system employing two grinding wheels. This former proposal has been generally satisfactory but it does not avoid some substantial fluctuation in power consumption due to the sudden retiring of a pressure foot after the completion of a grinding stroke or the sudden application of pressure on the logs at the beginning of a grinding stroke. Such fluctuations are quite severe if two pressure feet complete their grinding operation together or substantially simultaneously. A further disadvantage in conventional pulp grinding systems is that great difficulty is encountered in clearing the magazine when logs become jammed between the pressure foot and the grinding wheel.

It is therefore a main object of the present invention to provide a control means for a pressure cylinder and operating in a hydraulic system for controlling fluctuations in power consumption under all conditions of operation.

Another object of the invention is to achieve such control by novel method and apparatus designed to control the operation of a pressure cylinder, i. e., to control the piston of the cylinder by means of a control unit operating with a low-pressure system, in addition to the prior high-pressure system.

A further object of the invention is to provide a control unit comprised of a plurality of interoperatively related valve means designed to control one pressure cylinder and employing low-pressure fluid for initial control of the pressure foot piston of the pressure cylinder which the control unit serves, in its advancing and retiring movement and to cushion the piston at the ends of its stroke.

A still further object of the invention is to provide a control unit as before which includes means whereby the high-pressure fluid may be applied to drive the pressure foot piston under load when the pressures behind said piston reach a predetermined value.

A still further object of the invention is to provide a control unit as described which includes means for varying the grinding pressure applied by a pressure foot piston under load by means of a variable back pressure from the low-pressure line applied to the front of the piston.

A still further object of the invention is to provide a control unit having means whereby the same may be manually controlled in its operation and further including means whereby the pressure foot of a cylinder may be halted at any position so that the magazine of its pressure cylinder may be cleared.

A still further object of the invention is to provide electrical means governing actuation of the valves of the present control unit actuatable by limit switch means operatively related with the movement of the pressure foot piston of its pressure cylinder and including an arrangement whereby the electrical circuits of a plurality of control units according to the present invention, are related in series electrically whereby only one control unit may cause actuation of its pressure cylinder at any one time.

With these and other objects in view, the invention generally relates to a method of controlling power flurry in pulp grinder units comprising the steps of controlling advancing or retiring movement of the piston of a pressure cylinder of a grinding unit by means of low-pressure fluid wherein the low-pressure fluid is introduced at either end of the pressure cylinder to drive the piston by applying pressure at either end. When the piston is advancing, communication between the front end of the pressure cylinder and the sump is severed, not later than substantially simultaneously with the cutting off of pressure fluid from the back end of said pressure cylinder, thereafter low-pressure fluid is introduced into the front end of said cylinder and the rear end thereof is placed in communication with a sump substantially simultaneously whereby said piston is retarded within said pressure cylinder. The retired limit of travel of said piston is cushioned by severing communication between the rear end of the pressure cylinder and the sump, and at about the same time shutting off the supply of pressure fluid from in front of the piston. The front end of the pressure cylinder is then placed in communication with the sump and at the same time low-pressure fluid is introduced into the rear end of said cylinder to cause the piston thereof to advance. Finally, when the pressure behind said piston arrives at a predetermined value the high-pressure fluid is communicated to the back end of the pressure cylinder to drive the piston under load. This method is carried out by way of practical apparatus embodying a control unit designed to control the operation of a pressure cylinder of a pulp grinder in which the piston of said cylinder is adapted to be driven by hydraulic pressure derived from a low-pressure line and a high-pressure line; and comprising, a plurality of operatively related valve means, certain of which are in communication with the back end of said cylinder, and others of which are in communication with the front end of said cylinder. The valve means are designed to place the front end of said cylinder in communication with the low-pressure line to cause a retiring of the piston, and means are provided for actuation of the plurality of valves in predetermined order to urge said piston forward after it has completed its retiring stroke. Means are also included for placing said high-pressure line in communication with the back end of said cylinder to apply high-pressure to said piston when the pressure behind said piston approaches a predetermined value.

In addition, the present invention incorporates means whereby the pressure foot of a cylinder may be halted at any position, and the remaining pressure feet of the system continue operating. Each control unit is designed to operate automatically and includes electrical relay means in an electrical circuit, inter-relating various control units in any one system which govern the operation of the valves of each control unit by virtue of a limit switch operable by each pressure foot or piston of each pressure cylinder. The relay means of the control circuit are placed electrically in series whereby only one control unit may be actuated to retire its pressure cylinder piston at any one time. In the event that the electrical system breaks down for any reason, means are included whereby the system may be manually operated, thus, assuming that high-pressure and low-pressure water or fluid is obtainable from the reservoir, an operator may by operation of a single valve, continue operating a particular pressure cylinder. Means are also included for varying the grinding pressure to be applied by the pressure cylinder operated by the control unit by applying an adjustable pressure head at the front of the piston of the pressure cylinder in opposition to the driving pressure applied to the rear of the piston. This back pressure, that is to say, the pressure applied in front of the piston may be different as between all four cylinders of a system causing the governor, such as described in Canadian Patent No. 387,960, to automatically apply four different effective pressures.

It will be apparent that the control unit of the present invention is designed for use with a single pressure cylinder of a pump grinding system and, therefore, it will be necessary to employ with each pressure cylinder of such a system a control unit having the advantages above outlined and hereinafter more particularly described.

Reference is therefore made to the accompanying drawings wherein Figure 1 is a diagrammatic view of a control unit according to the present invention, connected between a governed high pressure fluid supply from a fluid reservoir and a pump grinding pressure cylinder. This diagrammatic illustration is intended to infer that an opposed pressure cylinder may be connected to a different control unit (not shown) which is connected in parallel with the control unit shown, to the governor controlled fluid pressure system.

Figure 2 is a perspective view of a control unit of the present invention connected to a pressure cylinder of a pump grinding unit.

Figure 3 is a diagrammatic view of a pressure cylinder showing the hydraulic means controlling operation of the same and involves a plurality of valves A, B, C, D, and E, which comprise the control unit shown in Figure 2 when mounted upon the control stand in conjunction with certain operating valves also diagrammatically shown. In this figure, the piston is shown in the advancing position with the operative positions of the elements of valves A to E in the relative operative position.

Figure 10 is a sectional view of the preferred structure for the B valve or the D valve of the control unit.

Figure 11 is a partial sectional view of the E valve of the control unit with the top cover removed.

Figure 12 is a partial sectional view of the C valve of the control unit showing a compression spring cylinder mounted on the top of the valve of a type which is also mounted on the tops of the B, D and E valves tending to force the piston of each valve downwardly within the valve body or housing.

Figure 15 is a side elevation of the control span which mounts valves A to E as shown in Figure 2.

Figure 16 is a front elevation of Figure 15.

Figure 17 is a view 17—17 of Figure 15.

Figure 18 is a view 18—18 of Figure 15, also diagrammatically illustrating by chain lines, a control valve hereinafter referred to as the I valve for controlling the back pressure on the piston of the pressure cylinder.

Figure 19 is view 19—19 of Figure 15.

Figure 20 is a sectional view taken on the line 20—20 of Figure 16.

Figure 1:
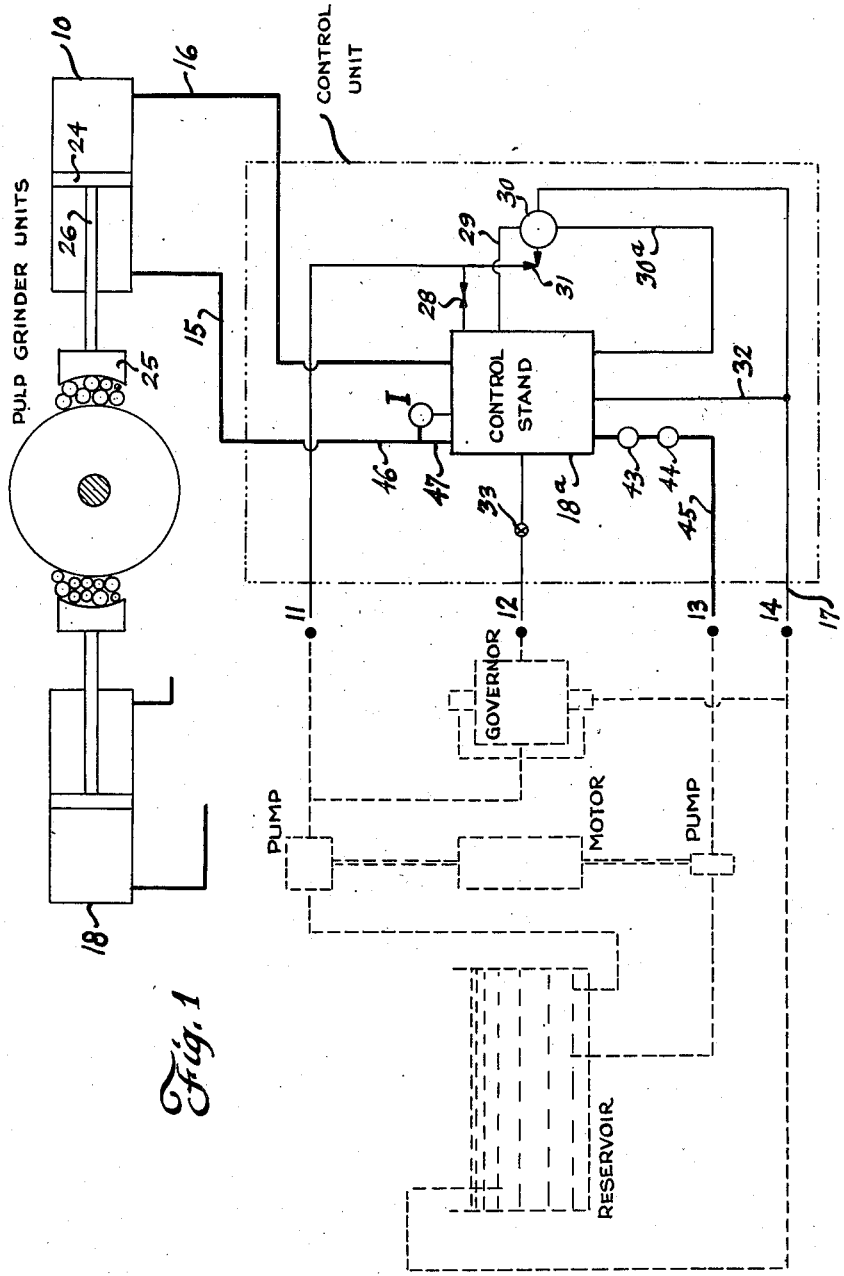

Referring now to the drawings and particularly to Figure 1, a pulp grinding system is indicated schematically and includes a control unit of the present invention between each pressure cylinder 10 and the hydraulic terminals 11, 12, 13 and 14 of the well-known pressure system shown in chain lines. It will be apparent that the control unit uses raw high pressure from terminal 11, governed high pressure from terminal 12, raw low pressure from terminal 13, and controllably delivers same by means of lines 15 and 16 to the front or back of the pressure cylinder 10, discharge or sump water being returned to the reservoir by means of line 17 connecting to terminal 14. It will be apparent that a control unit connected in parallel with that shown in Figure 1 to terminals 11 to 14 may communicate to pressure cylinder 18. It is possible therefore, in the hydraulic system to operate as many cylinders as desired, providing a control unit according to the present invention is employed to operate each, all control units being connected in parallel hydraulically as regards the supply of pressure fluid.

Figure 2:
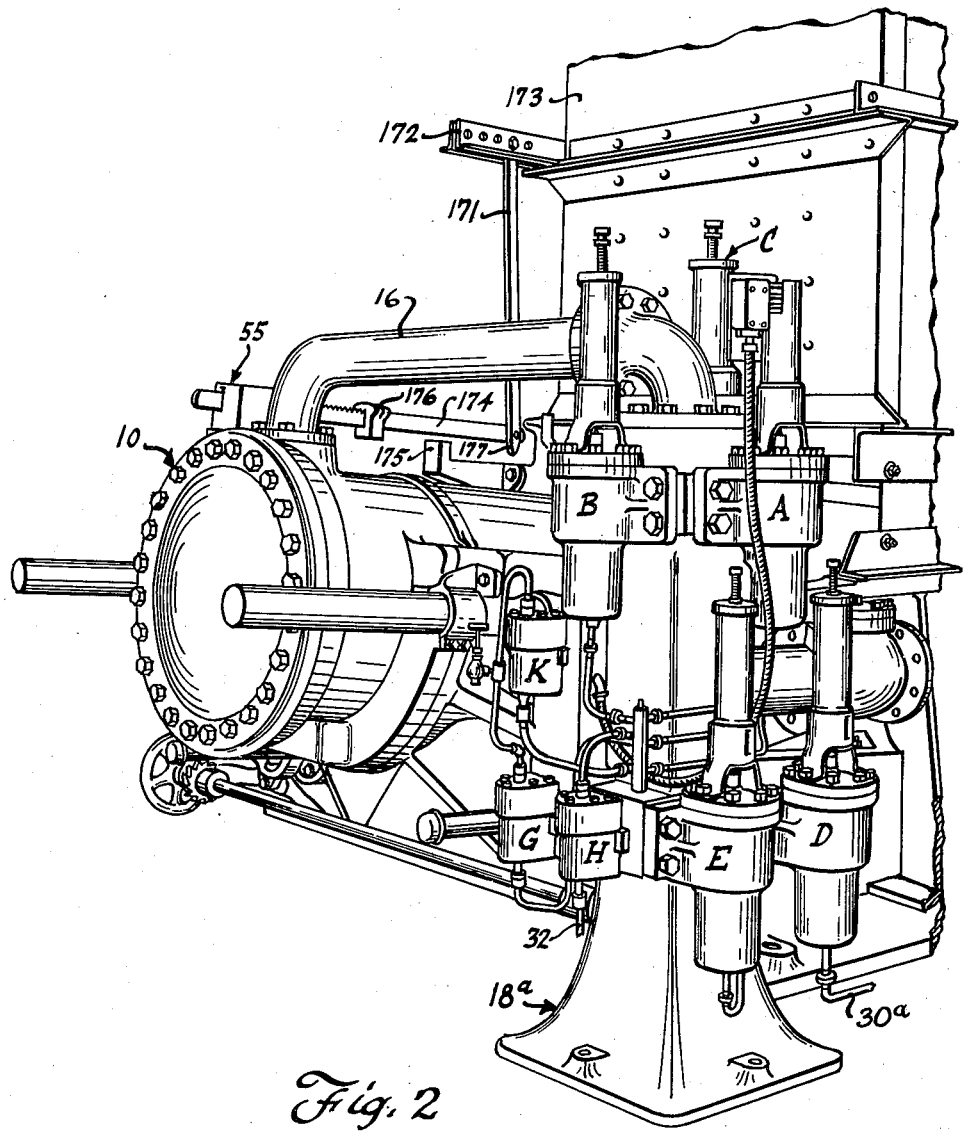

In Figure 2, a control unit according to the present invention is shown comprised of a control stand 18a having mounted thereon and hydraulically operatively related, valves A, B, C, D and E. The top of the control stand communicates by way of conduit 16 to the back of the pressure cylinder 10. Also mounted on the control stand are magnetic valves, each being of the same design as that disclosed in my prior Canadian Patent 387,961 designated by letters G, H and K.

In order to appreciate the features of the present control unit, it is first necessary to discuss the operation by reference to Figures 3 to 9.

In the following figures, as in Figures 1 and 2, like numerals indicate like components.

Operation

Figure 3:
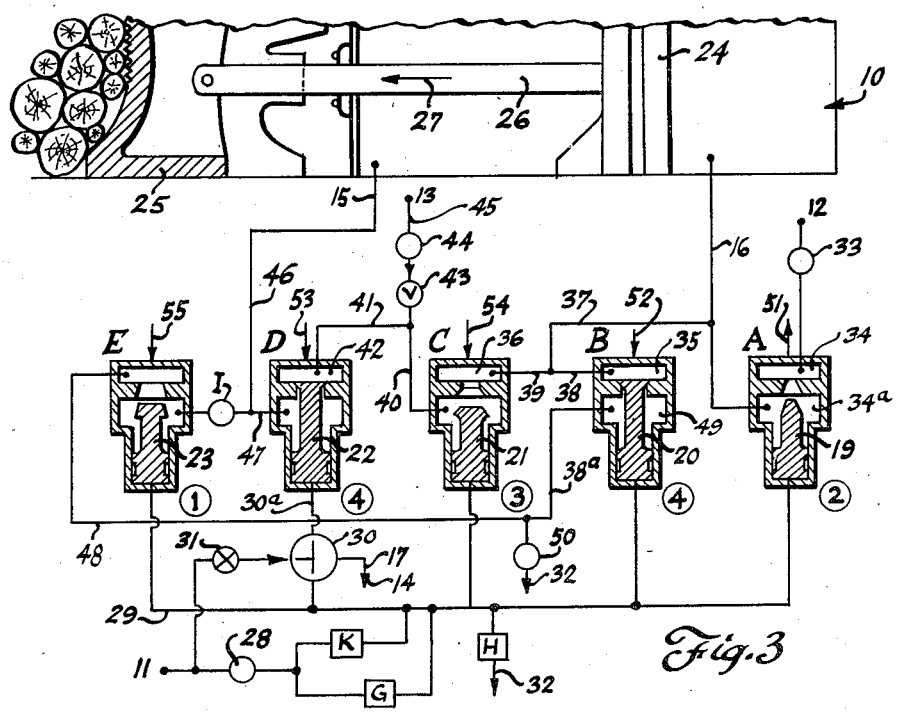

In Figure 3, valves A to E are designated by letters as formerly, each having valve closure components or pistons 19, 20, 21, 22 and 23. Pressure cylinder 10 has a conventional piston 24 with a pressure foot or ram 25 extending therefrom and operatively connected thereto by a piston arm or rod 26. Arrow 27 indicates that the piston is advancing, corresponding to the positions of the valve pistons 19 to 23 indicated in this figure.

High pressure from terminal 11, that is, directly from the pressure pump, passes through the needle valve 28 to the magnetic valves K and G and thence to the control feeder line 29. The latter communicates to the bottom of valves A, B, C and E directly, but passes through a four-way valve 30 to the bottom of the D valve. The emergency feed valve 31 communicates with the valve 30 and also with terminal 11 (see Figure 1) but for normal operation is closed. The four-way valve also has a return line 17 extending therefrom and connecting to terminal 14 (see Figure 1). In the position of the four-way valve shown, both in Figures 3 and 4, the control feeder line communicates directly therethrough to the bottom of the D valve for normal operation. The magnetic valve H connects from the control feeder line and delivers return water by way of line 32 to terminal 14 as indicated also in Figure 1.

For the desired operation of advancing the piston in Figure 3, the electrical current is shut off in the magnetic valves K and G but the current is on in the magnetic valve H, the electrical functions to be described hereinafter, but assumed for the present. It will be evident therefore, that the control feeder line will assume normal pressure since it is placed in communication with the reservoir of Figure 1. Valves A to E therefore, may be assumed as being in the down position shown, in which instance governed high pressure will be flowing through the globe valve 33 (see Figure 1) from terminal 12 to the upper chamber 34 of the A valve. The A valve being opened, the fluid circuit will be complete therethrough and high pressure fluid will be injected by way of line 16 to the rear of the pressure cylinder 10. The latter line is also in communication with the upper chambers 35 and 36 of valves B and C as indicated by lines 37, 38 and 39; the B valve being closed, a branch of the high pressure fluid will flow through the C valve and pass by way of lines 40 and 41 to the upper chamber 42 of the D valve. A check valve 43 prevents the high pressure from flowing in the direction of the globe or gate valve 44 which is in communication with the low pressure supply or terminal 13 by way of line 45 as indicated in Figure 1. It will be apparent therefore, that the high pressure will ensure closure of valves B and D at this point in operation, but that no pressure is necessarily dissipated in accomplishing this function.

It will be assumed that fluid is within the pressure cylinder in front of the piston and therefore, that as the piston proceeds forward fluid will exit from the cylinder by way of line 46 which communicates to the lower chambers of the valves D and E by way of lines 47 and the relief valve I respectively. The E valve being open and assuming that the I valve is open, this waste fluid will pass through the E valve and into the return line 48 which communicates with the lower chamber 49 of valve B and also with the valve 50 which is in communication with line 32, which in turn communicates to terminal 14 (see Figure 2). Valve 50 being open, the fluid will return to the reservoir as the piston 24 proceeds forward in the cylinder 10. It is important to note that the valve A has a heavy spring represented by arrow 51 tending to pull the piston 19 thereof into the closed position at all times. The remaining valves B to E have similar springs but which act to force the pistons thereof downwardly in each case. Valves B and D have heavy springs 52 and 53 whereas valves C and E have light springs 54 and 55.

In Figure 3, the piston is shown advancing in the cylinder 10 and as it approaches the end of its grinding stroke a limit switch 55 mounted on the cylinder 10 (see Figures 2 and 14) is actuated, causing the K valve to open and the H valve to close. The K valve has a small orifice of about $55/1000$ of an inch in diameter so that pressure will build up in the control line gradually. All valves have high pressure fluid in their upper chambers with the exception of the E valve which has a light spring and therefore the piston 23 of the E valve will rise first. As a result, the pressure in front of the piston 24 of the pressure cylinder will build up as the piston advances until the pressures on either side of the piston are substantially equal. The A valve has a heavy spring tending to pull its piston or closure member 19 into the closed position and therefore the A valve will close next, cutting off the high pressure fluid from the back of the piston 24. It is thus apparent that the end limit of travel of the piston 24 is first cushioned and then the pressure is relieved from the back of the piston. At this point, it should be noted, that as the A valve closes, a limit switch 56 (see Figure 13) is actuated, which opens the G valve, which has a large orifice and allows full raw high pressure to be injected into the control feeder line. The C valve will therefore be closed next since its spring 54 is lighter than the springs of the B and D valves and communication will be cut off between the latter two valves. Thereafter, the B and D valves open at substantially the same time and low-pressure from terminal 13 will flow through check valve 43 and through valve D and line 46 to the front of the piston, urging the same backward in the cylinder 10. Since the B valve opens at the same time as the D valve, the fluid in the cylinder behind the piston is allowed to drain through lines 16, 37 and 38, through the B valve and line 38a in the valve 50 to line 32 and hence to the return line terminal 14 (see Figure 3).

Figure 4:
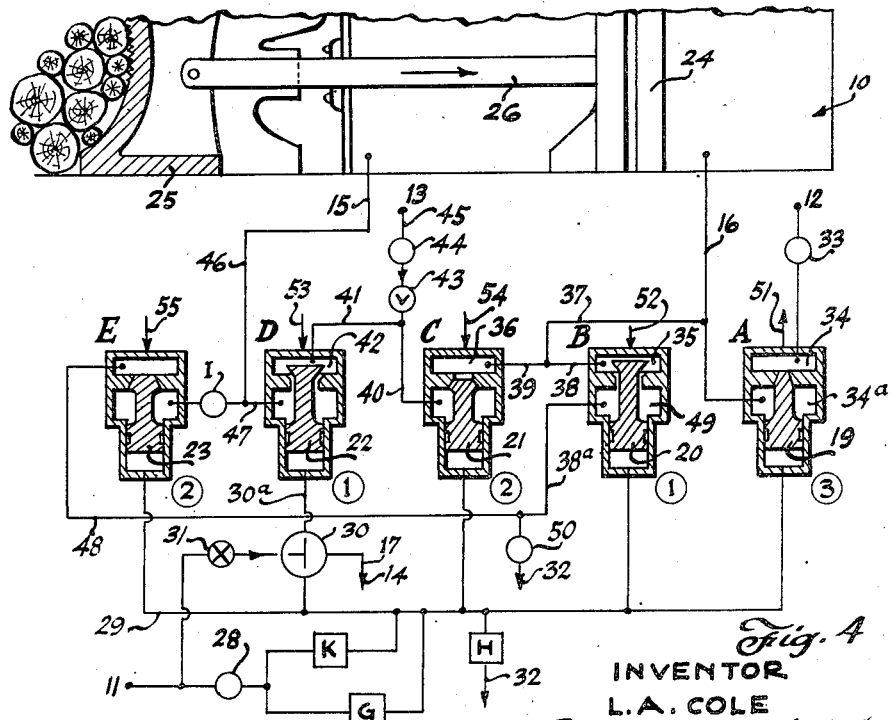
Figure 4 is a further operative view of Figure 3 showing the positions of the elements of valves A to E when the piston is retiring in the pressure cylinder.
Figure 8:
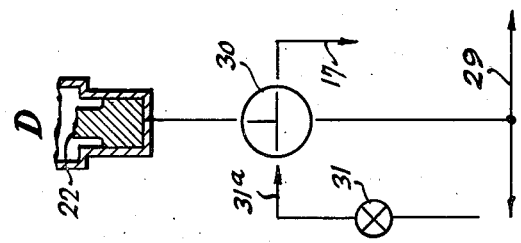
Figure 8 is a diagrammatic view of the position of the four-way valve for halting the position of the pressure foot to allow clearing of the grinding pocket between the pressure foot and the grinding wheel of the grinding unit.

In order to follow the function relating to retarding of the piston 24 within the cylinder 10, it is necessary to refer to Figure 4. As the piston 24 approaches the rear of the cylinder 10, the limit switch 55 (see Figures 2 and 14) will be actuated, de-energizing the K and G valves causing them to be closed, and at the same time energizing the H valve and opening the same so that the control feeder line 29 will be in communication with the reservoir by way of terminal 14 as previously described. Valves B and D having heavy springs, will close first and substantially together, trapping remaining fluid behind the piston 24 in the cylinder 10 to cushion the end limit of travel of the piston 24, and at the same time shutting off low pressure water flowing into cylinder 10 in front of the piston 24 by way of line 46. The A valve has a heavy spring 51 tending to hold the same in a closed position whereas the C and E valves each have a light spring tending to open the same and therefore these latter valves will open next and substantially together placing the B and D valves in communication and also allowing communication through valve E from line 46 to line 48 and hence to the return terminal 14 and the reservoir (see Figure 1) as previously described. The low pressure water still being on, and now flowing from terminal 13 through the C valve and lines 39 and 37 to line 16, and the rear of the pressure cylinder 10, the pressure will build up behind the piston 24 urging same forward until sufficient resistance is presented to the pressure foot to cause a build-up of pressure behind the piston 24 to a value of approximately 90% of the low pressure in the low-pressure line. It will be noted that governed high pressure is in chamber 34 of the A valve and the raw high pressure is gradually impressed on the bottom of the piston 19 thereof from the control feeder line 29, the communicating port (not shown) into the bottom of the valve having a predetermined restriction. Low pressure from the line 16 is in the chamber 34a and at this point of operation tends to force the piston 19 downwardly in opposition to the heavy spring 51. This latter spring is adjusted to allow a dropping of the piston closure member 19 of valve A when the pressure in chamber 34a approaches a value of approximately 90% of the pressure from the low pressure terminal 13. As soon as the valve A opens high pressure water will flow therethrough into the cylinder 10, at the same time passing through valve C to valve D and cutting off or blocking the low pressure at the check valve 43.

One complete cycle of operation of a control unit in conjunction with a pressure cylinder has been described. It is however, relevant to describe how certain specific advantages attend by virtue of the construction of the present control unit.

Figure 6:
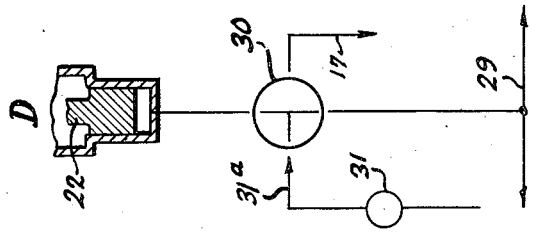
Figure 6 shows the position of a four-way valve for effecting retiring of the piston of the pressure cylinder by manual operation.
Figure 5:
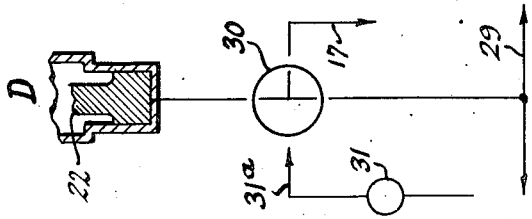
Figure 5 shows the position of the communicating passages within a four-way valve for manual operation of grinding in the event of current failure in the electrical system of the control unit.

Assuming that there has been current failure in the electrical system of the control unit (yet to be described) the actuation of limit switches 55 and 56 (see Figures 2, 13 and 14) will be of no effect and therefore control by means of the K, G and H valves would not take place. Figures 5 and 6 illustrate diagrammatically desired positions of the four-way valve 30 whereby manual operation of the control unit may be accomplished. First, the emergency feed valve 31 which is in communication with the raw high pressure terminal 11 as indicated in Figure 3 must be open.

In Figure 5, the position of the four-way valve is shown for grinding, that is, for an advance of the piston 24 in cylinder 10 (see Figure 3). It will be noted that the control feeder line 29 is placed in communication with line 17 which connects to terminal 14 and hence the reservoir, and therefore the pressure in the control feeder line 29 will be theoretically zero and the pistons of valves A to E will be down as shown in Figure 3.

Figure 6 shows the position of the four-way valve 30 for retiring of the pressure foot 25. The raw high pressure water will flow through valve 31 and line 31a into the valve 30 branching into the bottom of the D valve, and into the high pressure line 29, communication to line 17 being cut off. The pistons of valves A to E will assume the positions shown in Figure 4 with attendant operation previously described. It will therefore be apparent that should an electrical failure occur with any one control unit, that operation may continue by means of manual actuation of the four-way valve 30 after the high pressure valve 31 is opened.

Figure 7:
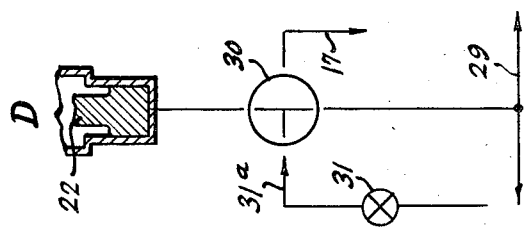
Figure 7 is a diagrammatic view of the position of the four-way valve in normal operation of the system as shown in Figures 3 and 4.

Figure 7 merely indicates diagrammatically the position of the four-way valve 30 for normal operation, in which case the high pressure valve 31 is closed as previously described with reference to Figures 3 and 4. However, when logs become jammed between the pressure foot 25 and the grinding stone, it is necessary for an operator to remove the jammed material. I provide means for incrementally moving the pressure foot backwardly as is evidenced in Figure 8 and involving the four-way valve 30. The high pressure valve 31 is closed, and the bottom of the D valve is placed in communication with line 17. It will be evident upon referring to Figure 4 that in such instance, the pressure foot would be halted in its backward travel since low pressure fluid would not flow through the D valve to the front of the piston 24. The four-way valve may be alternated between the positions shown in Figures 7 and 8 to cause incremental backward movement of the pressure foot. After the jammed material has been cleared from in front of the pressure foot, the operator may throw the limit switch 55 (see Figures 2 and 14) to the "off" position, and throw the four-way valve to the position shown in Figure 7 causing the piston 24 to move forward in the cylinder 10. Thereafter, the control unit following its normal cycle of operation as previously described.

Electrical circuit

Figure 9:
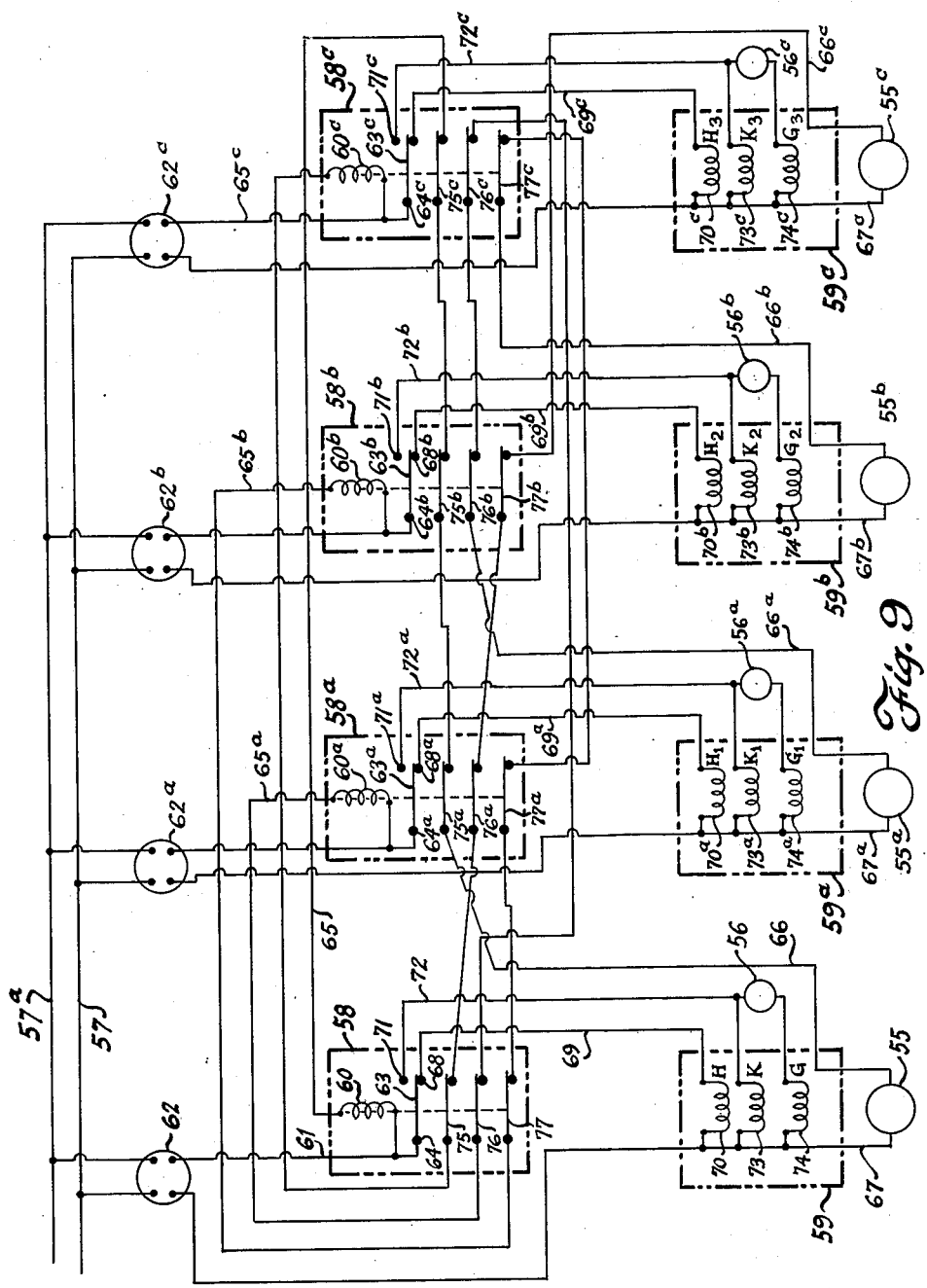
Figure 9 is an electrical schematic of an electrical system for four pressure cylinders which are controlled by four control units according to the present invention.

Referring to Figure 9, an electrical schematic is shown for four control units designed to operate four pressure cylinders. Four control circuits are shown interrelated in Figure 9, each of which governs the operation of the G, H and K valves of each control unit.

Referring to the figure therefore, the electrical lines 57 and 57a connect to a conventional current source (not shown) such as a 110-volt direct current supply line. A bank of relays 58 and the magnetic valves 59 comprise the necessary components for effecting operation of one control unit. The relay bank 58 has an energizing coil 60 having one end connected to the line 61 which connects through double pole switch 62 to the line 57a. The relay arm 63 connects from its pivot end 64 to the line 61 as shown. The other end of coil 60 connects by means of line 65 to line 66 which passes through limit switch means 55 to line 67 which connects to double pole switch 62 and thence to line 57. It will be assumed, for the purposes of discussion of one control unit, and the relays and magnetic valves in respect thereto, that lines 65 and 66 are connected electrically. The arm 63 of the relay is normally closed with contact 68 which communicates by line 69 to the solenoid 70 of the H valve, the other side of the solenoid being connected to line 67 as shown. Contact 71 connects by line 72 to the solenoid 73 of the K valve, the other side of the solenoid being connected to line 67. Line 72 also communicates through the limit switch means 56 on the A valve, to the solenoid 74 of the G valve, the other side of this solenoid being connected to line 67.

As shown, there will be a through circuit from line 57a through the relay arm 63 to line 69, through solenoid 70 of the H valve, to line 67, and hence line 57, in which case the magnetic valve H will be open. This corresponds to operation diagrammatically shown in Figure 3, since it will be apparent that there can be no current flowing in the solenoid 73 and 74 as terminal 71 makes no connection with the relay arm 63. However, assuming lines 65 and 66 are electrically connected, it will be apparent that when the limit switch means 55 is closed, a coil 60 will be energized causing the arm 63 to engage the contact 71. The solenoid 73 of the K valve will be immediately energized causing that valve to open and when the A valve closes, closing limit switch 56, the solenoid 74 of the G valve will be energized to open that valve at the same time arm 63 opens contact 68 closing H valve.

The above description relates to the necessary electrical means employed for the operation of one control unit where it is desired that each control unit operate entirely independent of the other.

However, upon referring to Figure 9, it will be apparent that only one relay coil can operate at any one time in a multicylinder, multicontrol system and therefore the maximum load change which the governor must compensate for is substantially only that experienced with the changing load conditions in one pressure cylinder at a time.

In order to accomplish the desired result therefore, it is necessary to mount a number of relay arms in conjunction with each relay coil corresponding to the number of other cooperating control units. Thus, the relay bank 58 has three further relay arms 75, 76 and 77 as do the remaining relay banks 58a, 58b and 58c of the four control unit system. It was assumed above that lines 65 and 66 were electrically connected and this requirement must be met for each relay bank and cooperating valve unit. The relevant circuits can be traced by means of sub-alphabet numbers, and it will be apparent upon tracing the circuit that the line 65 for instance, connects to the line 66 by passing through three relay arms of three different relay banks in the series and numbered 75a, 75b and 75c. Therefore, it will be apparent that the coil 60 could not be energized unless the remaining coils 60a, 60b and 60c also were not energized. As shown in the figure any one of coils 60a to 60c could be energized as soon as any one of the limit switch means 55 to 55c was closed by actuation in conjunction with means mounted on its pressure cylinder and the movement of the pressure foot thereof.

Structure

Although it will be evident that I have described a workable control unit system according to my invention, one practical design of the mechanical components of the system is illustrated and will be described in order to ensure that all features of my invention are appreciated. It will be noted however, that the design to be described is capable of considerable modification and merely represents one practical form.

The structure of valves A to E will first be described, valves B and D being shown in section in Figure 10 and comprising a valve body 78 having upper and lower chambers 79 and 80 and a lower cylinder chamber 81. An annular valve seat 82 rests in the partition 83 and is adapted to receive the valve member 84 which extends upwardly from the piston 85. Guide vanes 86 extend downwardly from the valve element 84 to the piston 85. The valve body 78 has a top 87 fastened thereto by suitable bolts 88 and a central bushing 89 having a suitable packing 90 adapted for passage of the control rod 91 which extends upwardly from the valve closure element 84 as shown. Ports 92 and 93 communicate with chambers 79 and 80 respectively. The valve body 78 has a port 94 at the bottom end for passage of pressure fluid from the control feeder line 29 (see Figure 3) into the bottom of the valve. Spring means (not shown) and yet to be described with reference to Figure 12 are included for ensuring positive engagement of the valve closure element or member 84 with the seat 82.

Figure 11 shows the preferred structure for the E valve in which the body 95 has upper and lower chambers 96 and 97 separated by a partition member 98 having a central bore adapted to receive a valve seating means 99. A conical valve member 100 extends upwardly from the valve piston (not shown but similar to that shown in Figure 10) having the control rod 101 extending upwardly through the top of the valve (removed from the drawing for clarity) to connect to spring means designed to provide normal disengaged position of the valve closure member 100 in the seat 99. Ports 102 and 103 provide communication with the upper and lower chambers 96 and 97 respectively. It will be apparent that fluid entering port 103 and filling chamber 97 will proceed up through the valve orifice 104 to the upper chamber 96, passing to the outer annular space between the seat 99 and the walls of the chamber 96, between the partitions 105.

Referring to Figure 12, valve C is shown in the open position and is comprised of a body 106 having upper and lower chambers 107 and 108 separated by a partition 109 which mounts the valve seat 110. The valve closure member 111 is mounted on a piston 112, the latter being substantially similar to piston 85 of valves B and D. Valve guide vanes 113 extend upwardly from the valve closure member 111 for slidable engagement within the inner bore 114 of the valve seating means 110, a central control rod 115 extending upwardly from the guide vanes through the top 116 of the valve to be engaged by compression spring means 117. The control rod mounts a platform 118 slidable within the spring cylinder 119, the latter being mounted by suitable legs 120 to the top 116 of the valve by means of the top fastening bolts 121. The spring cylinder 119 has a top 122 which mounts an adjustable screw 123, the latter having at its lower end, a suitable disc 124 designed to engage one end of the spring means 117. The spring 117 is held between the disc 124 and platform 118, adjustment of the compression in the spring by means of screw 123 providing adjustment of the pressure necessary to close the valve C. Valves B, D and E have similar spring cylinders mounted in a similar manner, which all tend to force their pistons downwardly within the body of each valve. The springs of the B and D valves are heavy in comparison to the compression of the springs in the C and E valves. All valves B to E have a port in the bottom end of the body for communication with the control feeder line 29 as shown in Figures 3, 4 and 10. As found in the consideration of valves B, D and E, the C valve body 106, has ports 124 and 125 communicating with the upper and lower chambers 107 and 108 respectively.

Figures 13, 14:
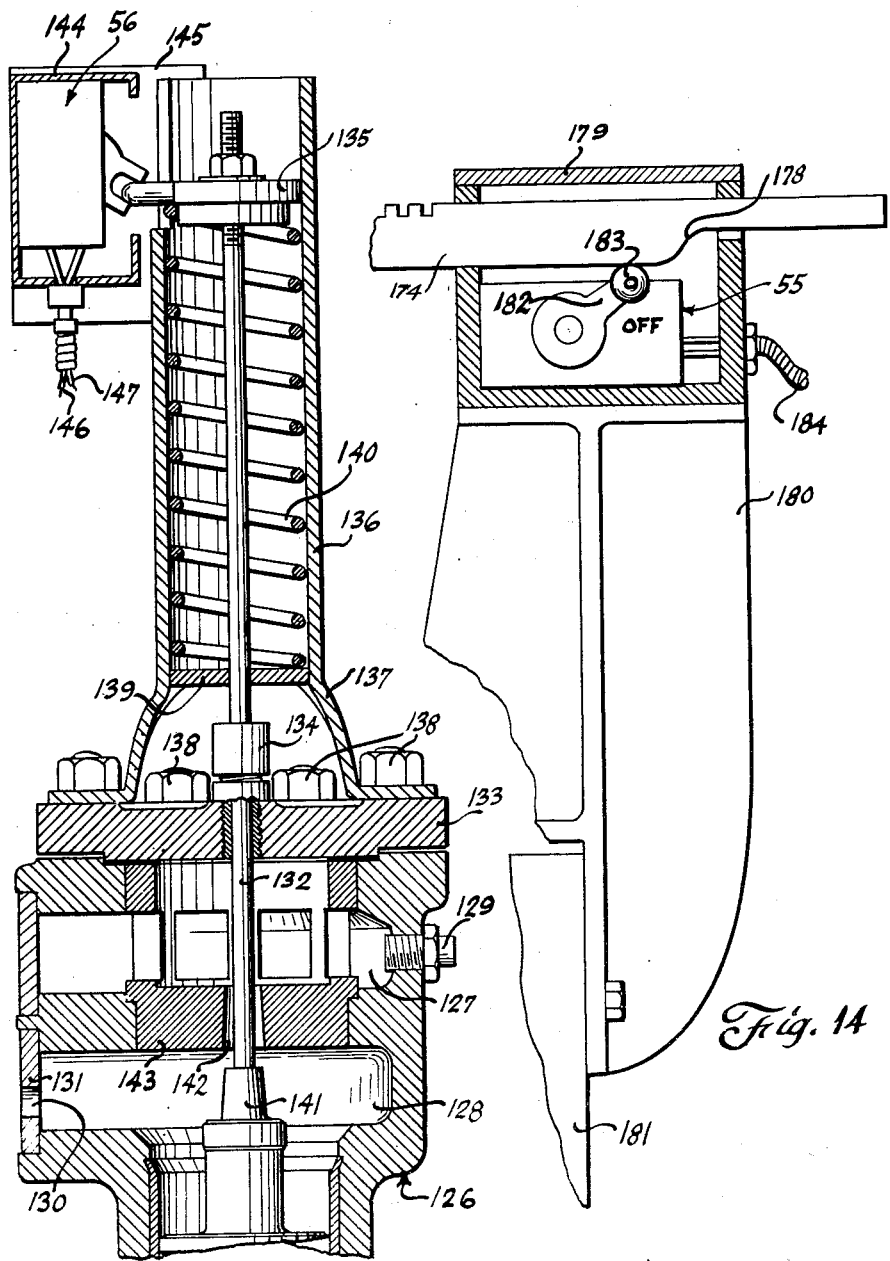
Figure 13 is a partial sectional view of the A valve of the control unit of the present invention showing limit switch means actuable by the movement of the piston and which electrically control raising of B, C and D valves.
Figure 14 is a partial sectional view of limit switch means operative in conjunction with the movement of the piston of the pressure cylinder which the present control unit controls.

The structure of the A valve is shown in Figure 13 and is comprised of a valve body 126 having upper and lower chambers 127 and 128. The structure shown here is similar to that described with respect to the E valve Figure 11, with the exception that communication is provided into the upper chamber 127 by means of a fitting 129, which extends to the globe valve 33 and high pressure terminal 12 as shown in Figures 1 and 3 previously described. The lower chamber 128 has an exit port 130 in the plate 131, which is preferably mounted as a separate component in the body 126. The control rod 132 of the A valve extends upwardly through the top 133 of the body and packing gland 134 to adjustably mount an actuating disc 135 at its upper end. Disc 135 is slidable within the bore of the spring cylinder 136 which has suitable legs 137 extending for fastening to the top 133 of the valve by means of suitable bolts 138. A bottom plate 139 confines a spring 140 within the spring cylinder 136, the spring serving to provide normal closure of the A valve by engagement of the closure element 141 within the conical bore 142 of the valve seat 143. Similar to the construction shown in Figure 10, the A valve has a port at the lower terminus of its body 126 for communication with the control feeder line 29 (see Figure 3). The upper end of the spring cylinder 136 mounts limit switch means 56 which are encased within a suitable box 144 mounted on the base plate 145 extending from fixture to the spring cylinder. Suitable leads 146 and 147 extend for connection to the K and G valves respectively.

Although the valves A to E described would be operable when connected by suitable piping, I have devised a control stand which is particularly adapted for mounting the valves of the structure shown to arrange the assembly in one complete compact unit. The control stand is shown in Figures 15 and 16 and comprises a stand 148 having a plurality of inner channels to provide the necessary communication between the ports of the valves as shown in Figures 3 and 4. In Figure 15 the A valve is mounted so that the port 130 is in alignment with the port 148 and is fastened to the stand by suitable bolts fixed in the bolt holes 149. Port 148 communicates to the upper chamber 150 which communicates by way of port 151 to the conduit 16 shown in Figures 2, 3 and 4. Chamber 150 also communicates by means of ports 152 and 152a with the upper chambers 79 and 107 of the B and C valves respectively. (Referring to Figure 3, this involves the connecting lines 37, 38 and 39 extending from line 16). The lower port 93 of B valve communicates by way of port 153 to the downwardly extending channel 154 which communicates to the port 155. The E valve is mounted so that its port 102 is in alignment with its port 155, the port 103 being in alignment with the port 156. The channel 154 therefore corresponds to lines 48 and 38a of Figures 3 and 4. Referring to Figure 15 port 156 leads to the through bore 157 (see Figure 18) which communicates to the I valve by means of suitable piping 158, indicated in chain lines. The other side of the I valve communicates to the port 159 which leads to the inner chamber 160 which is in communication with the lower port 93 of the D valve by means of port 161 (see Figure 16). Chamber 160 also communicates by way of port 162 which is in communication by way of line 46 (see Figure 3) with the front end of the pressure cylinder 10.

Port 163 (see Figures 15 and 16) communicates by way of the downwardly extending channel 164 to the port 165, placing the lower port 125 of the C valve which is mounted in alignment with port 163, in communication with the upper port 92 of the D valve, the latter being mounted in alignment with port 165 (see Figure 3, lines 40 and 41). A fitting 166 communicates with the downwardly extending channel 164 and is designed to provide communication to check valve 43, valve 44 and line 45 shown in Figures 3 and 4. Another fitting 167 communicates to the downwardly extending channel 154 for communication with valve 50 and line 32 leading to terminal 14 of the reservoir (see Figures 1 and 3). Figure 19 shows the sectional detail of the fittings 166 and 167 and their communication to channels 164 and 154 respectively. The G and H valves are mounted in the through bores 168 and 169, the electrical leads being passed downwardly through the open chamber 170 and passing by means of suitable cables (not shown) for appropriate connection in the electrical circuit shown in Figure 9. The K valve is mounted on a suitable member extending from the stand 146 in an appropriate manner.

In Figure 13, the limit switch means 56 are shown in the "off" position when the A valve is open. In Figure 14 limit switch means 55 are shown in the "off" position corresponding to an advance of the piston 24 of pressure cylinder 10 as shown in Figure 3. Referring also to Figure 2, a suitable pendant arm 171 is suspended from a beam 172 extending from the magazine 173 of the pulp grinder and mounts an actuating arm 174 at its lower end. Finger 175 extending from operative connection to the ram or pressure foot 25 (see Figure 3) is designed to engage the adjustable stop 176 or the lower end 177 of the pendant arm 171. The movement of the finger between the distance limits corresponding to the adjustment between the stop 176 and the lower end 177 of the pendant arm 171 determines the travel limits of the piston 24 within the cylinder 10 and therefore the extent of movement of the ram or pressure foot 25 toward and away from the grinding wheel. Referring to Figure 14, the arm 174 terminates in the step 178 and is slidably mounted within the housing 179 which houses the switch means 55. Housing 179 is mounted on a suitable casting 180 which extends from the side 181 of the pressure cylinder 10. The switch arm 182 has a suitable roller 183 which rides in the step 178. Suitable leads 184 extending from switch means 55 for appropriate connection in the electrical circuit (shown in Figure 9).

It will be apparent that as the pressure foot 25 (see Figure 3) proceeds forward and approaches the end limit of its travel, that finger 175 will engage the lower end 177 of the pendant arm 171 thereby causing withdrawal of the arm 174 from the housing 179 (see Figure 14), thereby allowing the switch arm 182 to rotate counter-clockwise and providing a through circuit in switch means 55 resulting ultimately in opening of the K valve and closing of the H valve. When the pressure foot 25 retires to the adjustable end limit of its travels, the finger 175 will engage the stop 176 causing the arm 174 to be thrust into the housing 179, the step 178 as it passes over the switch arm 182 causing rotation of the latter clockwise to open the electrical circuit in the switch means 55, whereupon both the K and G valves close, and the H valve opens as previously described.

In Figure 2, the piping or tubing shown interconnecting the G, H and K valves requires no description since a skilled person may follow the fluid circuit diagram of Figures 3 or 4 and connect these components to function in the desired manner.

Although I have described a specific form of my invention, it will be appreciated that many alternatives will be apparent to skilled persons. For example, the K valve may be eliminated by a 55/1000 of an inch diameter orifice hydraulically in parallel with the G valve. In the operation discussed above, it will be realized that the K valve is open when the H valve is closed. It is therefore not really necessary to employ two such valves, the advantage of including the K valve is to ensure against waste water when the H valve is open, since by the use of a simple orifice described, water would continue to flow through the same from the raw high pressure line into the control feeder line. I have found that when control units according to the present invention are included in a hydraulic pulp grinding system to control the operation of the pressure cylinders, the power or load peaks have been substantially eliminated due, no doubt, in large part, to the cushioning of the piston of the pressure cylinder at the ends of its stroke before applying either the high pressure or the low pressure for retiring or advancing the piston. Also, by utilizing an electrical arrangement represented by the circuit diagram of Figure 9, it will be apparent that the possibility of more than the load demand required for one pressure cylinder occurring at any one time is eliminated. A plurality of pressure cylinders controlled by control units according to the present invention which are electrically interrelated as described are actuated separately, but the actuation of the pistons of the pressure cylinder takes place in no predetermined order. It is also possible, by means of the I valve, which is a relief valve (see Figures 3, 4 and 18) to lessen the power flurry set up by logs bumping the grinding stone. The speed of advance of the piston is controlled by the I valve, by controlling any desired pressure ahead of the main piston. This back pressure may be different on all four pockets of a conventional four-cylinder system, thus causing the governor to automatically apply four different effective pressures. The four-way valve 30, shown in Figures 3 to 8, serves as an effective and simple means of operating the control unit in the event that the electrical circuit of the control unit breaks down, or in halting the pressure foot 24 at any desired position when the grinding pocket must be cleared.

In former types of hydraulic systems for driving pulp grinders where a governor was used to govern the load on the grinding motor by controlling the pressures applied by various pressure feet, when a pressure foot completed its grinding operation, the pressure which it applied to the grinding stone would be suddenly released. The conventional method of releasing pressure is to cut off the supply of high pressure water to the back end of the pressure cylinder behind the piston. As a result, the total load on the grinding motor is reduced suddenly and the governor is called upon to supply a large amount of high pressure water to the remaining pressure cylinders and increase the pressures on their pressure feet to compensate for the sudden reduction of load on the grinding motor. However, I obviate this disadvantage, as it will be apparent from the above description, by gradually releasing the load applied to the grinding motor by any one pressure foot at the end of its travel due to the cushioning of the piston formerly described. This could be accomplished by gradually cutting off the supply of high pressure fluid by way of the A valve but I prefer to gradually release the load in the manner already described. That is to say, when the limit switch 55 is actuated the H valve is closed and the K valve is opened (see Figure 9) and therefore the E valve will close first as previously described (see Figure 3). The governed high pressure fluid in driving the piston forward after closure of the E valve works against build up of pressure in the front end of the pressure cylinder causing the load applied against the grinding stone to be gradually reduced. This will allow the governor (see Figure 1) to compensate for the change in load and call for greater pressure to be applied on the remaining pressure feet of the system. Also where two limit switches have been tripped, one after the other, it will be apparent that the second cannot cause actuation of its pressure cylinder until the first has completed its withdrawal and begun to apply full load. It will be apparent from the former description that the second pressure cylinder cannot be actuated until the first limit switch is actuated by the full return of the piston thereof. However, it would still be disadvantageous to allow the second pressure cylinder to retire and release its load from the grinding stone until the first is again driving under full load conditions. It is obvious for this reason therefore, that the K valve has a small orifice to delay the actuation of the E valve in each case so that even when the H valve is closed by actuation of the limit switch, the pressure cylinder will not cease applying pressure to the grinding stone for a predetermined period of time after actuation of the limit switch. The limit switch means must therefore, be adjusted to cause the return of the pressure foot before the magazine is empty.

Although I have shown the present control unit as deriving certain high-pressure fluid from a governor of the prior art, it will be appreciated that it is an entirely separate unit. As such, my control unit is capable of operating satisfactorily to control the actuation of a pressure cylinder where the governed high-pressure terminal at Figure 1 is common with the raw high-pressure terminal. In such instance, it would be desirable to employ some sort of governor in the electrical power system driving the grinder motor and the pump motor which may or may not be related to the hydraulic pressure system.

Various modifications may be made in the invention without departing from the spirit thereof, or the scope of the claims; and therefore, the exact forms shown are to be taken as illustrative only, and not in a limiting sense; and I desire that only such limitations shall be placed thereon as are imposed by the prior art or are specifically set forth in the appended claims.

What I claim as my invention is:

1. In a hydraulic system for driving the pressure foot pistons of a plurality of pressure cylinders of a pulp grinding unit in which the hydraulic pressure supplies include, a raw high-pressure terminal, a governed high-pressure terminal, a low-pressure terminal, and a return line terminal; a plurality of control units connected hydraulically in parallel to said terminals, each being designed to control the operation of a pressure foot piston of one pressure cylinder, and including means hydraulically connecting the control unit to either end of the pressure cylinder which it controls to apply hydraulic pressure to either end of the pressure foot piston, and electrical means governing operation of each control unit including relay means designed to be connected electrically in series with the relay means of other control units of said system whereby the electrical systems of said control units so inter-related may cause actuation of only one control unit and the pressure foot piston of its pressure cylinder at any one time.

2. In a hydraulic system for driving the pressure foot pistons of a plurality of pressure cylinders of a pulp grinding unit in which the hydraulic pressure supplies include, a raw high-pressure terminal, a governed high-pressure terminal, a low-pressure terminal, and a return line terminal; a plurality of control units connected hydraulically in parallel to said terminals, each being designed to control the operation of a pressure foot piston of one pressure cylinder, and including means hydraulically connecting the control unit to either end of the pressure cylinder which it controls to apply hydraulic pressure to either end of the pressure foot piston, and electrical means governing operation of each control unit including relay means designed to be connected electrically in series with the relay means of other control units of said system whereby the electrical systems of said control units so inter-related may cause actuation of only one control unit and the pressure foot piston of its pressure cylinder at any one time, and adjustable valve means for each control unit designed to control the discharge of fluid from the front end of the pressure cylinder in front of said piston when the latter is advancing, whereby the grinding pressure of the pressure foot may be controlled independently for each pressure cylinder.

3. In a hydraulic system for driving the pressure foot pistons of a plurality of pressure cylinders of a pulp grinding unit in which the hydraulic pressure supplies include, a raw high-pressure terminal, a governed high-pressure terminal, a low-pressure terminal, and a return line terminal; a plurality of control units connected hydraulically in parallel to said terminals, each being designed to control the operation of a pressure foot piston of one pressure cylinder, and including means hydraulically connecting the control unit to either end of the pressure cylinder which it governs to apply hydraulic pressure on either end of the pressure foot piston, and electrical means governing operation of each control unit including relay means designed to be connected electrically in series with the relay means of other control units of said system whereby the electrical systems of said control units so inter-related may cause actuation of only one control unit and the pressure foot piston of its pressure cylinder at any one time, and valve means whereby said plurality of valves may be manually controlled in their operation in the event of failure of said electrical circuit.

4. In a hydraulic system for driving the pressure foot pistons of a plurality of pressure cylinders of a pulp grinding unit in which the hydraulic pressure supplies include, a raw high-pressure terminal, a governed high-pressure terminal, a low-pressure terminal, and a return line terminal; a plurality of control units connected hydraulically in parallel to said terminals, each being designed to control the operation of a pressure foot piston of one pressure cylinder, and including means hydraulically connecting the control unit to either end of the pressure cylinder which it controls to apply hydraulic pressure on either end of the pressure foot piston, and electrical means governing operation of each control unit including relay means designed to be connected electrically in series with the relay means of other control units of said system whereby the electrical systems of said control units so inter-related may cause actuation of only one control unit and the pressure foot piston of its pressure cylinder at any one time, said plurality of valves having designations A, B, C, D, and E each being comprised of a body having a pair of chambers with a port communicating between said chambers and a closure member designed normally to shut off communication between said chambers of the B and D valves and normally to allow communication between said chambers of the A, C, and E valves, spring means in connection with the closure members of the B, C, D, and E valves adjustable to retain the same in their normal positions, one of the chambers of the A valve being in communication with said governed high-pressure terminal, the other chamber being in communication with the rear end of said pressure cylinder, whereby governed high-pressure is applied to the back end of said pressure foot piston when the closure member of the A valve is out of engagement with the port between the chambers thereof, spring means designed to provide closure of the port of the A valve by said closure member in opposition to governed high-pressure whereby the closure member of said A valve is relieved from engagement with said port to allow communication between said chambers when the fluid pressure in the chamber of the A valve communicating to the back end of said pressure cylinder reaches a predetermined value according to the compression of the A valve spring.

5. In a hydraulic system for driving the pressure foot pistons of a plurality of pressure cylinders of a pulp grinding unit in which the hydraulic pressure supplies include, a raw high-pressure terminal, a governed high-pressure terminal, a low-pressure terminal, and a return line terminal; a plurality of control units connected hydraulically in parallel to said terminals, each being designed to control the operation of a pressure foot piston of one pressure cylinder, and including means hydraulically connecting the control unit to either end of the pressure cylinder which it controls to apply hydraulic pressure on either end of the pressure foot piston, and electrical means governing operation of each control unit including relay means designed to be connected electrically in series with the relay means of other control units of said system whereby the electrical systems of said control units so inter-related may cause actuation of only one control unit and the pressure foot piston of its pressure cylinder at any one time, and adjustable valve means for each control unit designed to control the discharge of fluid from the front end of the pressure cylinder in front of said piston when the latter is advancing, whereby the grinding pressure of the pressure foot may be controlled independently for each pressure cylinder, and valve means whereby said plurality of valves may be manually controlled in their operation in the event of failure of said electrical circuit.

6. In a hydraulic system for driving the pressure foot pistons of a plurality of pressure cylinders of a pulp grinding unit in which the hydraulic pressure supplies include, a raw-high pressure terminal, a governed high-pressure terminal, a low-pressure terminal, and a return line terminal; a plurality of control units connected hydraulically in parallel to said terminals, each being designed to control the operation of a pressure foot piston of one pressure cylinder, and including means hydraulically connecting the control unit to either end of the pressure cylinder which it controls to apply hydraulic pressure on either end of the pressure foot piston, electrical means governing operation of each control unit including relay means designed to be connected electrically in series with the relay means of other control units of said system whereby the electrical systems of said control units so inter-related may cause actuation of only one control unit and the pressure foot piston of its pressure cylinder at any one time, adjustable valve means for each control unit designed to control the discharge of fluid from the front end of the pressure cylinder in front of said piston when the latter is advancing, whereby the grinding pressure of the pressure foot may be controlled independently for each pressure cylinder, said plurality of valves having designations A, B, C, D, and E each being comprised of a body having a pair of chambers with a port communicating between said chambers and a closure member designed normally to shut off communication between said chambers of the B and D valves and normally to allow communication between said chambers of the A, C and E valves, spring means in connection with the closure members of the B, C, D, and E valves designed to retain the same in their normal positions, one of the chambers of the A valve being in communication with said governed high-pressure terminal, the other being in communication with the rear end of said pressure cylinder, whereby governed high-pressure is applied to the back end of said pressure foot piston when the closure member of the A valve is out of engagement with the port between the chambers thereof, spring means designed to provide closure of the port of the A valve by said closure member in opposition to governed high-pressure whereby the closure member of said A valve is relieved from engagement with said port to allow communication between said chamber when the fluid pressure in the chamber of the A valve communicating to the back end of said pressure cylinder reaches a predetermined value according to the compression of the A valve spring.

7. In a hydraulic system for driving the pressure foot pistons of a plurality of pressure cylinders of a pulp grinding unit in which the hydraulic pressure supplies include, a raw high-pressure terminal, a governed high-pressure terminal, a low-pressure terminal, and a return line terminal; a plurality of control units connected hydraulically in parallel to said terminals, each being designed to control the operation of a pressure foot piston of one pressure cylinder, and including means hydraulically connecting the control unit to either end of the pressure cylinder which it controls to apply hydraulic pressure on either end of the pressure foot piston, electrical means governing operation of each control unit including relay means designed to be connected electrically in series with the relay means of other control units of said system whereby the electrical systems of said control units so inter-related may cause actuation of only one control unit and the pressure foot piston of its pressure cylinder at any one time, valve means whereby said plurality of valves may be manually controlled in their operation in the event of failure of said electrical circuit, said plurality of valves having designations A, B, C, D, and E each being comprised of a body having a pair of chambers with a port communicating between said chambers and a closure member designed normally to shut off communication between said chambers of the B and D valves and normally to allow communication between said chambers of the A, C, and E valves, spring means in connection with the closure members of the B, C, D, and E valves designed to retain the same in their normal positions, one of the chambers of the A valve being in communication with said governed high-pressure terminal, the other being in communication with the rear end of said pressure cylinder, whereby governed high-pressure is applied to the back end of said pressure foot piston when the closure member of the A valve is out of engagement with the port between the chambers thereof, spring means designed to provide closure of the port of the A valve by said closure member in opposition to governed high-pressure whereby the closure member of said A valve is relieved from engagement with said port to allow communication between said chambers when the fluid pressure in the chamber of the A valve communicating to the back end of said pressure cylinder reaches a predetermined value according to the compression of the A valve spring.

8. In a hydraulic system for driving the pressure foot pistons of a plurality of pressure cylinders of a pulp grinding unit in which the hydraulic pressure supplies include, a raw high-pressure terminal, a governed high-pressure terminal, a low-pressure terminal, and a return line terminal; a plurality of control units connected hydraulically in parallel to said terminals, each being designed to control the operation of a pressure foot piston of one pressure cylinder, and including means hydraulically connecting the control unit to either end of the pressure cylinder which it controls to apply hydraulic pressure on either end of the pressure foot piston, electrical means governing operation of each control unit including relay means designed to be connected electrically in series with the relay means of other control units of said system whereby the electrical systems of said control units so inter-related may cause actuation of only one control unit and the pressure foot piston of its pressure cylinder at any one time, adjustable valve means for each control unit designed to control the discharge of fluid from the front end of the pressure cylinder in front of said piston when the latter is advancing, whereby the grinding pressure of the pressure foot may be controlled independently for each pressure cylinder, valve means whereby said plurality of valves may be manually controlled in their operation in the event of failure of said electrical circuit, said plurality of valves having designations A, B, C, D, and E each being comprised of a body having a pair of chambers with a port communicating between said chambers and a closure member designed normally to shut off communication between said chambers of the B and D valves and normally to allow communication between said chambers of the A, C, and E valves, spring means in connection with the closure members of the B, C, D, and E valves designed to retain the same in their normal positions, one of the chambers of the A valve being in communication with said governed high-pressure terminal, the other being in communication with the rear end of said pressure cylinder, whereby governed high-pressure is applied to the back end of said pressure foot piston when the closure member of the A valve is out of engagement with the port between the chambers thereof, spring means designed to provide closure of the port of the A valve by said closure member in opposition to governed high-pressure whereby the closure member of said A valve is relieved from engagement with said port to allow communication between said chambers when the fluid pressure in the chamber of the A valve communicating to the back end of said pressure cylinder reaches a predetermined value according to the compression of the A valve spring.

9. A control unit designed to control the operation of a pressure cylinder of a pulp grinder in which the piston of said cylinder is adapted to be driven by hydraulic pressure derived from a low-pressure line and a high-pressure line, comprising, a plurality of operatively related valve means, certain of which are in communication with the back end of said cylinder, others of which are in communication with the front end of said cylinder, said valve means being designed to place the front end of said cylinder in communication with said low-pressure line to cause a retiring of the piston in said cylinder, means for providing actuation of said plurality of valves in predetermined order to urge said piston forward after it has completed its retiring stroke, means placing said high-pressure line in communication with the back end of said cylinder to apply high-pressure to said piston when the pressure behind said piston approaches a predetermined value, said valve means each comprising a body having upper and lower chambers and a closure member designed to seal off communication between the upper and lower chambers of certain of said valves when actuated and to allow communication between the upper and lower chambers of others of said valves when actuated, the means for providing actuation of said valves in predetermined order comprising, valve means for communicating high-pressure fluid to said valves for actuating the respective closure members, and means in connection with each valve for determining the order of actuation of the closure member thereof.

10. A control unit designed to control the operation of a pressure cylinder of a pulp grinder in which the piston of said cylinder is adapted to be driven by hydraulic pressure derived from a low-pressure line and a high-pressure line, comprising, a plurality of operatively related valve means, certain of which are in communication with the back end of said cylinder, others of which are in communication with the front end of said cylinder, said valve means being designed to place the front end of said cylinder in communication with said low-pressure line to cause a retiring of the piston in said cylinder, means for providing actuation of said plurality of valves in predetermined order to urge said piston forward after it has completed its retiring stroke, means placing said high-pressure line in communication with the back end of said cylinder to apply high-pressure to said piston when the pressure behind said piston approaches a predetermined value, said valve means each comprising a body having upper and lower chambers and a closure member designed to seal off communication between the upper and lower chambers of certain of said valves when actuated and to allow communication between the upper and lower chambers of others of said valves when actuated, the means for providing actuation of said valves in predetermined order comprising, magnetic valve means for communicating high-pressure fluid to said valves for actuating the respective closure members, and spring means in connection with each valve for determining the order of actuation of the closure member thereof, said magnetic valve means comprising at least two electrically controlled magnetic valves, one of which is designed to place said operatively related valve means in communication with said high-pressure line when said piston is retiring, the other of said electrically controlled magnetic valves being designed to place said plurality of valves in communication with a return line when said piston is retiring whereby the closure members of said plurality of valves assume a normal position.

11. A control unit designed to control the operation of a pressure cylinder of a pulp grinder in which the piston of said cylinder is adapted to be driven by hydraulic pressure derived from a low-pressure line and a high-pressure line, comprising, a plurality of operatively related valve means, certain of which are in communication with the back end of said cylinder, others of which are in communication with the front end of said cylinder, said valve means being designed to place the front end of said cylinder in communication with said low-pressure line to cause a retiring of the piston in said cylinder, means for providing actuation of said plurality of valves in predetermined order to urge said piston forward after it has completed its retiring stroke, means placing said high-pressure line in communication with the back end of said cylinder to apply high-pressure to said piston when the pressure behind said piston approaches a predetermined value, said valve means each comprising a body having upper and lower chambers and a closure member designed to seal off communication between the upper and lower chambers of certain of said valves when actuated and to allow communication between the upper and lower chambers of others of said valves when actuated, the means for providing actuation of said valves in predetermined order comprising, magnetic valve means for communicating high-pressure fluid to said valves for actuating the respective closure members and spring means in connection with each valve for determining the order of actuation of the closure member thereof, said magnetic valve means comprising at least two electrically controlled magnetic valves, one of which is designed to place said operatively related valve means in communication with said high-pressure line, when said piston is retiring, the other of said electrically controlled magnetic valves being designed to place said plurality of valves in communication with a return line when said piston is retiring whereby the closure members of said plurality of valves assume a normal position, and limit switch means actuable by said piston governing operation of said magnetic valves.

12. A control unit designed to control the operation of a pressure cylinder of a pulp grinder in which the piston of said cylinder is adapted to be driven by hydraulic pressure derived from a low-pressure line and a high-pressure line, comprising, a plurality of operatively related valve means, certain of which are in communication with the back end of said cylinder, others of which are in communication with the front end of said cylinder, said valve means being designed to place the front end of said cylinder in communication with said low-pressure line to cause a retiring of the piston in said cylinder, means for providing actuation of said plurality of valves in predetermined order to urge said piston forward after it has completed its retiring stroke, means placing said high-pressure line in communication with the back end of said cylinder to apply high-pressure to said piston when the pressure behind said piston approaches a predetermined value, said valve means each comprising a body having upper and lower chambers and a closure member designed to seal off communication between the upper and lower chambers of certain of said valves when actuated and to allow communication between the upper and lower chambers of others of said valves when actuated, means for providing actuation of said valves in predetermined order comprising magnetic valve means for communicating high-pressure fluid to said valves for actuating the respective closure members and spring means in connection with each valve for determining the order of actuation of the closure member thereof, said magnetic valve means comprising at least two electrically controlled magnetic valves, one of which is designed to place said operatively related valve means in communication with said high-pressure line, when said piston is retiring, the other of said electrically controlled magnetic valves being designed to place said plurality of valves in communication with a return line when said piston is retiring whereby the closure members of said plurality of valves assume a normal position, and limit switch means actuable by said piston governing operation of said magnetic valves, and relay means in electrical circuit connection with said limit switch means designed to be connected electrically in series through the relay means of another control unit whereby only one limit switch means may cause actuation of its control unit at any one time, a plurality of control units so related controlling actuation of pressure cylinders in no predetermined order.

LORNE A. COLE.

REFERENCES CITED

The following references are of record in the file of this patent:

UNITED STATES PATENTS

| Number | Name | Date |
| --- | --- | --- |
| 1,333,659 | Hutchins | Mar. 16, 1920 |
| 1,333,660 | Hutchins | Mar. 16, 1920 |
| 1,602,211 | Read | Oct. 5, 1926 |
| 1,934,207 | Pennock | Nov. 7, 1933 |
| 1,982,711 | Vickers | Dec. 4, 1934 |
| 2,217,783 | Bell | Oct. 15, 1940 |
| 2,285,069 | Vickers | June 2, 1942 |
| 2,356,366 | Wise | Aug. 22, 1944 |